United States Patent
Ohta et al.

(10) Patent No.: US 8,413,230 B2
(45) Date of Patent: Apr. 2, 2013

(54) API CHECKING DEVICE AND STATE MONITOR

(75) Inventors: Ken Ohta, Yokohama (JP); Hisatoshi Eguchi, Yokohama (JP); Tomohiro Nakagawa, Yokosuka (JP); Atsushi Takeshita, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 804 days.

(21) Appl. No.: 12/562,574

(22) Filed: Sep. 18, 2009

(65) Prior Publication Data

US 2010/0077473 A1    Mar. 25, 2010

(30) Foreign Application Priority Data

Sep. 22, 2008   (JP) ................. P2008-242637
Aug. 27, 2009   (JP) ................. P2009-196691

(51) Int. Cl.
   *G06F 21/22*   (2006.01)
(52) U.S. Cl. ............... 726/17; 726/16; 719/328
(58) Field of Classification Search .............. 719/328; 726/16, 17
   See application file for complete search history.

(56) References Cited

U.S. PATENT DOCUMENTS

| | | | |
|---|---|---|---|
| 6,412,071 B1 | 6/2002 | Hollander et al. | |
| 7,325,083 B2 | 1/2008 | Watt et al. | |
| 7,330,981 B2* | 2/2008 | Willman | 713/193 |
| 7,725,737 B2* | 5/2010 | Konanka et al. | 713/190 |
| 2004/0128670 A1* | 7/2004 | Robinson et al. | 718/1 |
| 2004/0193888 A1 | 9/2004 | Wiseman et al. | |
| 2005/0033987 A1 | 2/2005 | Yan et al. | |
| 2005/0108562 A1 | 5/2005 | Khazan et al. | |
| 2005/0132122 A1 | 6/2005 | Rozas | |
| 2006/0070066 A1* | 3/2006 | Grobman | 718/1 |
| 2006/0253856 A1* | 11/2006 | Hu et al. | 718/104 |
| 2007/0016914 A1* | 1/2007 | Yeap | 719/328 |
| 2008/0098205 A1* | 4/2008 | Dolve et al. | 712/220 |
| 2008/0155509 A1 | 6/2008 | Ohta et al. | |
| 2009/0055693 A1 | 2/2009 | Budko et al. | |

FOREIGN PATENT DOCUMENTS

JP    2008-135004    6/2008

OTHER PUBLICATIONS

Extended European Search Report issued on Nov. 8, 2010, in Application No. 09170813.1
Office Action issued Apr. 26, 2011 in China Application No. 200910176280.0 (With English Translation).
Office Action issued Sep. 14, 2010, in Japanese Patent Application No. 2009-196691 (with English translation).
Office Action issued Apr. 1, 2012, in Chinese Patent Application No. 200910176280.0 (with English-language translation).

* cited by examiner

*Primary Examiner* — Haresh N Patel
*Assistant Examiner* — Mohammad Siddiqi
(74) *Attorney, Agent, or Firm* — Oblon, Spivak, McClelland, Maier & Neustadt, L.L.P.

(57) ABSTRACT

An API checking device 300 includes an API check request reception unit 301 to receive a determination request to request determination of whether to permit the API call, a state information acquiring unit 303 to acquire state information showing a state of the device 100, a check mode setting unit 305 to set a check mode for the API call on the basis of the state information acquired, a determining unit 307 to determine whether to permit the API call on the basis of the check mode, and a check result outputting unit 309 to output the check result generated by the determining unit 307.

12 Claims, 13 Drawing Sheets

FIG. 2

| FLAG TYPE | SET= 1, RESET= 0 |
|---|---|
| UNTRUSTED FLAG | 1 |
| USER OPERATION API INHIBIT FLAG PERMIT FLAG | 0 |
| PERMIT FLAG | 0 |
| PERMIT FLAG (LIST FORM FOR EACH PROGRAM) | (prog1, 2, 3)= (0, 1, 0) |
| LOCK RELEASE WAIT COOPERATION SUPPRESSION FLAG | 0 |
| USER CONFIRMATION WAIT COOPERATION SUPPRESSION FLAG | 0 |

FIG. 7
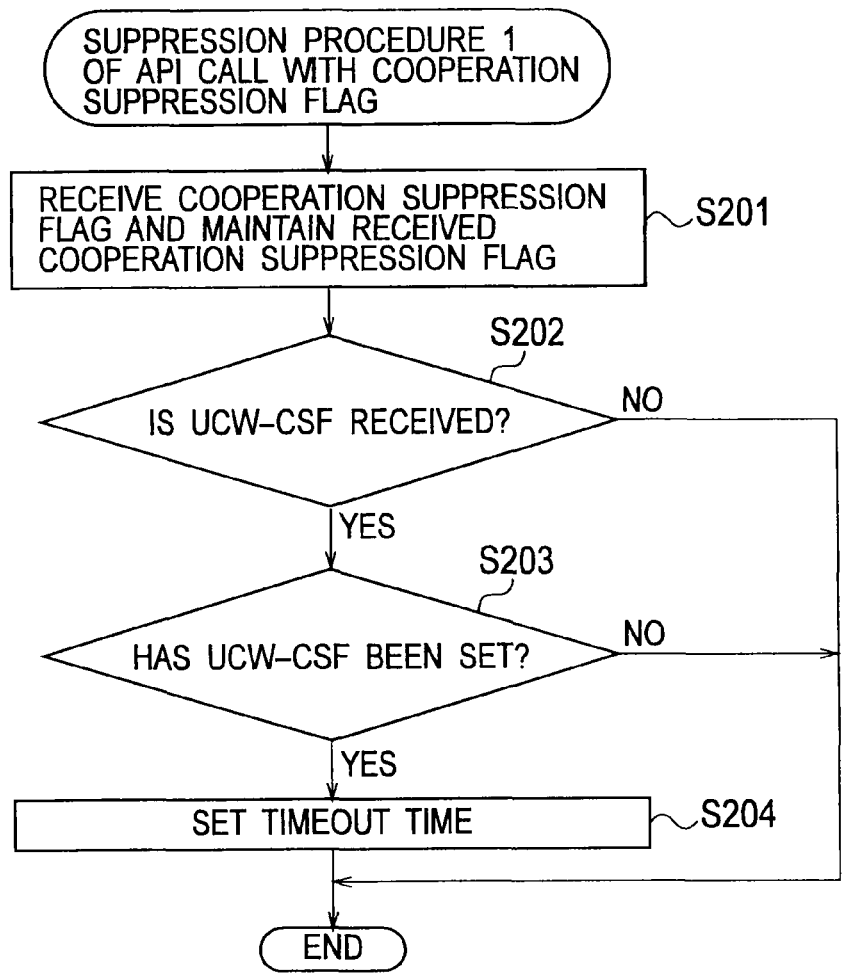
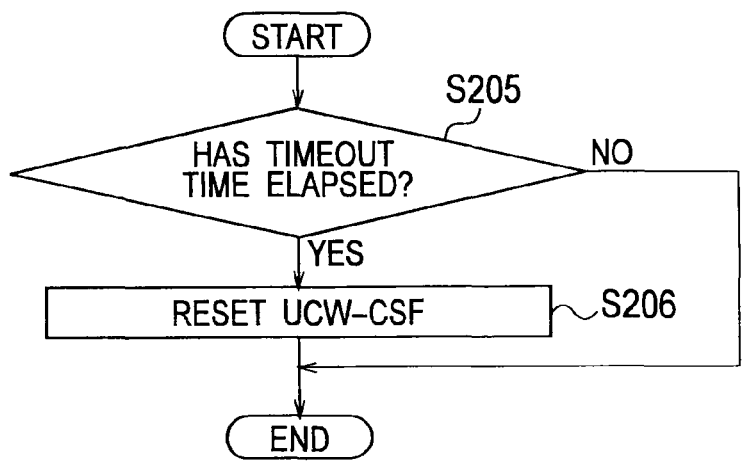

FIG. 11

| API TYPE | PROGRAM IDENTIFIER TO BE PERMITTED | | | |
|---|---|---|---|---|
| DRM API | program 1 | | | |
| SECURE STORAGE API | program 1 | program 2 | | |
| CRYPTO API | program 1 | program 2 | program 3 | program 4 | ated systems (OSs) in parallel on one CPU.

API CHECKING DEVICE AND STATE MONITOR

BACKGROUND OF THE INVENTION

1. Field of the Invention

The present invention relates to an API checking device and a state monitor implemented by software or hardware in devices such as mobile phones, PDAs, and PCs, and particularly relates to an API checking device disposed in a closed execution environment and a state monitor disposed in an open execution environment.

2. Description of the Related Art

Conventionally, in devices such as mobile phones, PDAs, and PCs, for example, there has been known a method for providing a so-called virtual machine monitor (VMM) which is software or hardware that can operate a plurality of operating systems (OSs) in parallel on one CPU.

In such a device, the following two execution environments can be safely isolated from each other and executed on respective OSs. In the first execution environment (hereinafter, referred to as open execution environment), programs other than trusted programs can also be executed freely or under given restriction. In the second execution environment (hereinafter, referred to as closed execution environment), predetermined processing is executed on the basis of an application program interface (API) call from the open execution environment, and only the trusted programs are executed. Here, the API call denotes a call of a function in the closed execution environment, a call for transferring and receiving data to and from the closed execution environment, etc.

Thus, the API functions provided by the closed execution environment can be called from the open execution environment. Thereby, sensitive functions and data to be protected can be used in a state where those functions and data are isolated in the closed execution environment, while free install of a program in the open execution environment is permitted (for example, U.S. Pat. No. 7,325,083).

In a technique disclosed in U.S. Pat. No. 7,325,083 mentioned above, it is assumed that an unauthorized API call is prevented by means of an access control function provided by an OS or the like disposed within the open execution environment. The access control function checks whether an API call source in the open execution environment is an authorized program. However, a malicious program such as a virus may enter the open execution environment. Additionally, there is a problem that an unauthorized API call becomes possible if the access control function is bypassed or cancelled by attack by a malicious user.

On the other hand, secure checking without interference of viruses or attack from malicious users is possible by executing: check as to whether a range of a value used as an argument of an API call or an unauthorized character is included; check on the format of transferred data; check of viruses; or the like, in the closed execution environment. However, such processing has heavy load, leading to problems such as exhaustion of a battery and deterioration of responsiveness in the mobile phones and the like.

Concerning such problems, there may be proposed a check mode set in accordance with a state of the open execution environment and that of the closed execution environment as checking means having processing load lower than that of check of the argument or the data and not being dependent only on the access control by the OS. For example, the following approach may be considered. An API checking device within the closed execution environment acquires status information on whether a program necessary for the API call (cooperation) and an unauthorized program are running in the open execution environment. When the necessary program is running and the unauthorized program is not running, the API call is permitted. Otherwise, the check mode may be set to a user warning mode for warning a user and urging the user to perform a confirmation. Here, when the program necessary for cooperation is not running, cooperation may fail, causing a failure. Therefore, measures such as warning the user in advance are needed.

However, this approach has the following problems. First, it raises operation cost to keep up with appearance of a variety of new unauthorized programs which may be continuously introduced into the open execution environment. Accordingly, another approach having lower operation cost is demanded.

Second, when the user is warned of one API call and urged to perform a confirmation, a user confirmation waiting state is kept until the user has replied to warning. During the user confirmation waiting state, other cooperation requests (API call) may be refused. However, issuance processing of a new cooperation request from the open execution environment in this state causes wasteful virtual machine switching and wasteful communication between virtual machines.

Third, introduction of checking means having lower processing load can exclude an unauthorized or unsuitable API call as a first filter. However, after such an API call passes the checking means, check having higher processing load such as check of the argument and the viruses may be executed. For that reason, delay of processing of the API call may increase to deteriorate response.

In light of such problems, an object of the present invention is to provide an API checking device and a state monitor in a device including an open execution environment and a closed execution environment, the API checking device and the state monitor capable of ensuring safety and reliability of cooperation by an API call between the open execution environment and the closed execution environment with low overhead.

To solve the above-described problem, the present invention has the following aspects. A first aspect of the present invention provides an API checking device disposed in a closed execution environment in a device including an open execution environment in which a program other than a trusted program can also be executed freely or under a given restriction; and the closed execution environment in which predetermined processing is executed on the basis of an API call that calls an application program interface from the open execution environment and only the trusted program is executed, and the API checking device includes an API check request reception unit configured to receive a determination request to request determination of whether to permit the API call within the closed execution environment from the open execution environment, a state information acquiring unit configured to acquire state information showing a state of the device, a check mode setting unit configured to set a check mode for the API call on the basis of the state information acquired by the state information acquiring unit, a determining unit configured to determine whether to permit the API call on the basis of the check mode set by the check mode setting unit, and to generate a check result of the API call, and a check result outputting unit configured to output the check result generated by the determining unit.

According to features of the present invention, in a device including an open execution environment and a closed execution environment, it is possible to provide an API checking device and a state monitor that is capable of ensuring safety and reliability of cooperation by an API call between the open execution environment and the closed execution environment with low overhead.

A Second aspect of the present invention provides a state monitor disposed in an open execution environment in a device including the open execution environment in which a program other than a trusted program can also be executed freely or under a given restriction, and the closed execution environment in which predetermined processing is executed on the basis of an API call that calls an application program interface from the open execution environment and only the trusted program is executed, and the state monitor includes a state manager configured to acquire a state of the device and maintain state information indicating the acquired state of the device, and a permission determining unit configured to determine whether to permit the API call within the closed execution environment from the open execution environment on the basis of the state information.

BRIEF DESCRIPTION OF THE DRAWINGS

FIG. 2 is a diagram showing an example of status information according to the embodiment of the present invention;

FIG. 7 is a diagram showing a suppression procedure (No. 1) of the API call with a cooperation suppression flag (lock release wait cooperation suppression flag (LRW-CSF) and user confirmation wait cooperation suppression flag (UCW-CSF)) according to the embodiment of the present invention;

FIG. 11 is a diagram showing an example of restriction of an API 131 by an API restriction manager 311 according to the embodiment of the present invention;

PREFERRED EMBODIMENTS OF THE INVENTION

Figure 1:
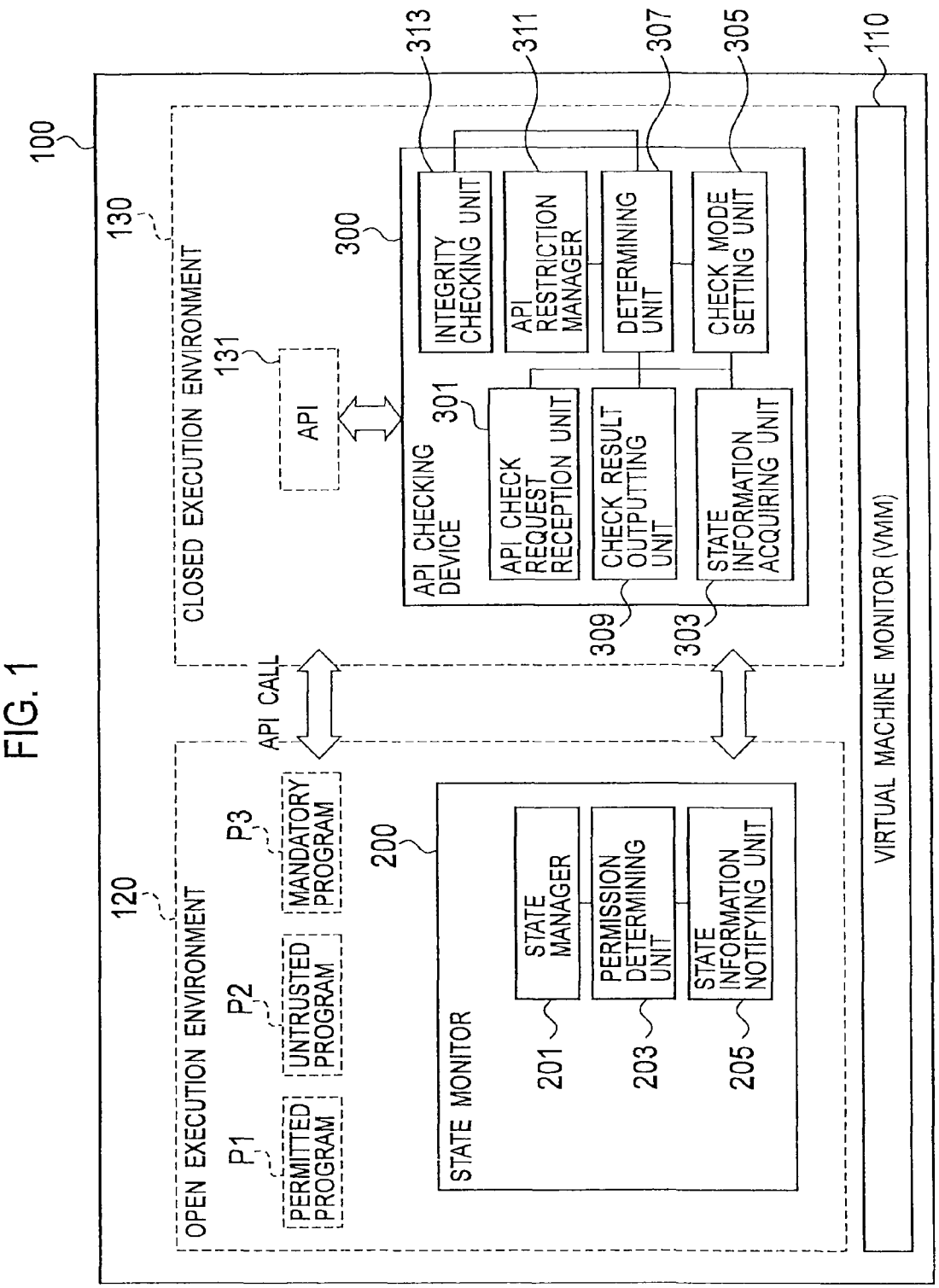
FIG. 1 is a functional block diagram of a device 100 according to an embodiment of the present invention.

Next, an embodiment according to the present invention will be described. Specifically, descriptions will be given of (1) a functional block configuration of a device, (2) a functional block configuration of a state monitor, (3) a functional block configuration of an API checking device, (4) advantageous effect, and (5) other embodiments.

Note that the same or similar portions are denoted by the same or similar reference numerals in the descriptions of the drawings below. It should be noted, however, that the drawings are schematic only, and that ratios of respective dimensions and the like differ from those in reality.

Accordingly, specific dimensions and the like should be determined in consideration of the descriptions below. In addition, some of the dimensional relations and ratios differ between the drawings as a matter of course.

(1) Functional Block Configuration of a Device

FIG. 1 is a functional block diagram of a device 100 according to this embodiment. In the device 100, a virtual machine monitor (VMM) 110 is provided, the VMM being software or hardware that can operate a plurality of operating systems (OSs) in parallel on one CPU (not shown).

In this embodiment, an open execution environment 120 and a closed execution environment 130 are implemented as OSs, respectively. In other words, the device 100 includes the open execution environment 120 and the closed execution environment 130.

In the open execution environment 120, a program (untrusted program P2) other than a permitted program P1, the permitted program P1 being a program determined as trusted by a provider of the device 100 (terminal manufacturer, telecommunication operator, etc.), can also be executed freely or under given restriction.

In the closed execution environment 130, predetermined processing is executed on the basis of an API call that calls an application program interface 131 (hereinafter, API 131) from the open execution environment 120, so that only a trusted program is executed.

A state monitor 200 is disposed in the open execution environment 120. The state monitor 200 monitors a state of the program executed in the open execution environment 120, and notifies an API checking device 300 of status information showing the state thereof.

The API checking device 300 is disposed in the closed execution environment 130. The API checking device 300 checks validity of the API call by the program executed in the open execution environment 120.

The open execution environment 120 and the closed execution environment 130 communicate with each other using inter virtual machine (VM) communication function. While it is assumed that the state monitor 200 and the API checking device 300 are each mounted as a device driver in this embodiment, the state monitor 200 and the API checking device 300 may be each mounted as software on OS such as middleware, or may be mounted as hardware.

(2) Functional Block Configuration of a State Monitor

As shown in FIG. 1, the state monitor 200 includes a state manager 201, a permission determining unit 203, and a state information notifying unit 205. Hereinafter, function of each block will be described.

(2.1) State Manager 201

The state manager 201 acquires a state of the device 100, and maintains state information showing the state acquired. FIG. 2 shows an example of the state information. As shown in FIG. 2, the state manager 201 can maintain an untrusted flag as the state information on the device 100. The untrusted flag is set when the untrusted program P2 determined as untrusted is running in the open execution environment 120, or when the untrusted program P2 is installed in the device 100. On the other hand, the untrusted flag is reset when the untrusted program P2 is not executed or when the untrusted program P2 is not installed in the device 100.

Examples of the untrusted program may include debugger software, a program that connects and communicates with an external PC and the like using USB or Bluetooth, and viruses or spyware programs that resemble a game, etc. Identification of the untrusted program can be attained by check of existence of a digital signature, for example. A program without the digital signature of a particular organization (terminal manufacturer, communication operator, particular software vender, etc.) is considered to be untrusted. Alternatively, trusted programs may be written in a white list, and a program other than the programs may be considered to be untrusted. Alternatively, untrusted programs may be written in a blacklist, and the programs may be considered to be untrusted.

The state manager 201 may also maintain the permit flag as the state information. The permit flag is set when an mandatory program P3 mandatory to normal execution of the API call to the closed execution environment 130 is properly running in the open execution environment 120, or when the mandatory program P3 is installed in the device 100. The permit flag is reset when the mandatory program P3 is failed or when the mandatory program P3 is not installed in the device 100. Failure of the mandatory program P3 can be detected by confirming existence of a reply. The state manager 201 can request the mandatory program P3 of the reply.

Examples of the mandatory program P3 may include the inter VM communication function, and a virus scanning program for protecting the security of the open execution environment 120. Further, when applications capable of calling API of the closed execution environment 130 are limited, applications permitted its API call are also included.

Further, the state manager 201 can maintain a user operation API inhibit flag as the state information, the user operation API inhibit flag set only when the device 100 is in a local lock state, a remote lock state, or an no-input operation state.

The local lock state is a state in which the device 100 is locked so that the user cannot operate the device 100 unless the user inputs an authorized PIN or password, or presses a particular button. When the user has not operated the device for a certain period, closes a clam shell type terminal, presses a particular button, or performs a particular setting, the device 100 shifts to the local lock state.

On the other hand, the remote lock state is a state in which the device 100 is locked on the basis of a request from a server that manages the device 100 or a request from a remote user so that the device 100 may not be operated. In both the local lock state and the remote lock state, the lock state can be acquired through an API provided by software that manages the state of the device, such as an OS and middleware.

The no-input operation state is a state in which the device 100 receives no input operation for a predetermined period. Presence of operation in a certain period from the present can be determined, for example, by collecting logs using a device driver of a keypad.

Moreover, acquisition of an execution state or an installation state of a program can be attained by: utilization of process management function or application management function of an OS; scan of a RAM (not shown); confirmation of a flag or data written by each program in a particular area; receiving of a notification issued when a program activates; and the like. The state manager 201 maintains the state information by storing the state information in storage such as a RAM or a hard disk. The state information is desirably maintained in a secured place in which the state information cannot be tampered.

Further, the state manager 201 can receive and maintain a lock release wait cooperation suppression flag (LRW-CSF) as the state information from the API checking device 300 disposed in the closed execution environment 130, the LRW-CSF set when the local lock state or the remote lock state changes to another state. The state manager 201 may also receive and maintain a user confirmation wait cooperation suppression flag (UCW-CSF) as the state information from the API checking device 300, the UCW-CSF set when a predetermined period elapses in a user confirmation waiting state in the closed execution environment 130.

The state manager 201 resets the UCW-CSF when a predetermined timeout time elapses. The state manager 201 determines a state as the user confirmation waiting state when there is no reply to the API call for a predetermined period after the API call is demanded. Then, the state manager 201 sets the UCW-CSF.

(2.2) Permission Determining Unit 203

The permission determining unit 203 determines whether to permit the API call within the closed execution environment 130 from the open execution environment 120 on the basis of the state information maintained by the state manager 201. Specifically, when a program (application etc.) calls the inter VM communication function, the inter VM communication function inquires of the state monitor 200 whether to permit the API call. The permission determining unit 203 replies to the inquiry with a determination result on whether to permit the API call or not. Alternatively, the program may inquire of the state monitor 200, and when the API call is permitted, the program may access the inter VM communication function to execute the API call.

In a case where the user operation API inhibit flag has been set and a type of the API call is permitted only when requested by operation of the user, the permission determining unit 203 can prohibit (suppress) the API call. When the untrusted flag has been set, the permission determining unit 203 may also warn the user in accordance with the state information. Then, the permission determining unit 203 can refuse the API call after asking the user whether to permit the API call or without performing the asking. For example, when the untrusted flag has been set, the permission determining unit 203 warns the user that "processing is interrupted because the system may not be normal," and prohibits the API call.

Moreover, when the permit flag has been reset, the permission determining unit 203 can warn the user in accordance with the state information. Then, the permission determining unit 203 may determine to refuse the API call after asking the user whether to permit the API call or without performing the asking. For example, when the permit flag has been reset, the permission determining unit 203 warns the user that "the system may not be normal. Continue processing?" Once the permission determining unit 203 performs this warning, further warning may be omitted. For example, once the permission determining unit 203 warns after start of the device 100, further warning may be omitted until restart of the device 100. Alternatively, the permission determining unit 203 may inquire of the user whether to continue warning.

Only when both the LRW-CSF and the UCW-CSF have been reset, the permission determining unit 203 can permit the API call of which a type is permitted only when requested by operation of the user. Moreover, when there is no reply to the API call for a predetermined period after the API call is demanded, the state manager 201 determines that the user confirmation waiting state is effective and sets the UCW-CSF.

When the UCW-CSF has been set, the permission determining unit 203 prohibits the API call permitted only when requested by operation of the user.

(2.3) State Information Notifying Unit 205

The state information notifying unit 205 notifies the API checking device 300 of the state information. Specifically, the state information notifying unit 205 notifies the API checking device 300 of the state information by using message passing, a shared memory, etc. Notification of the state information may be one way communication from the state monitor 200 to the API checking device 300, or the state monitor 200 may receive acknowledgment from the API checking device 300. A notified content may be encrypted, or a MAC (message authorization code) or a digital signature may be attached to the content.

Moreover, when the untrusted flag changes to the set state and when the permit flag changes to the reset state, the state information notifying unit 205 notifies the API checking device 300 disposed in the closed execution environment 130 of the state information. Note that, the API checking device 300 does not always need to be disposed in the closed execution environment 130.

(2.4) Operation of the State Monitor

Next, operation of the state monitor 200 will be described. Specifically, description will be given of (2.4.1) a suppression procedure of the API call in accordance with the lock state or the operating state, (2.4.2) a notification procedure of state information, (2.4.3) a suppression procedure of the API call using the untrusted flag or the permit flag, and (2.4.4) a suppression procedure of the API call using a cooperation suppression flag (CSF).

Figure 3:
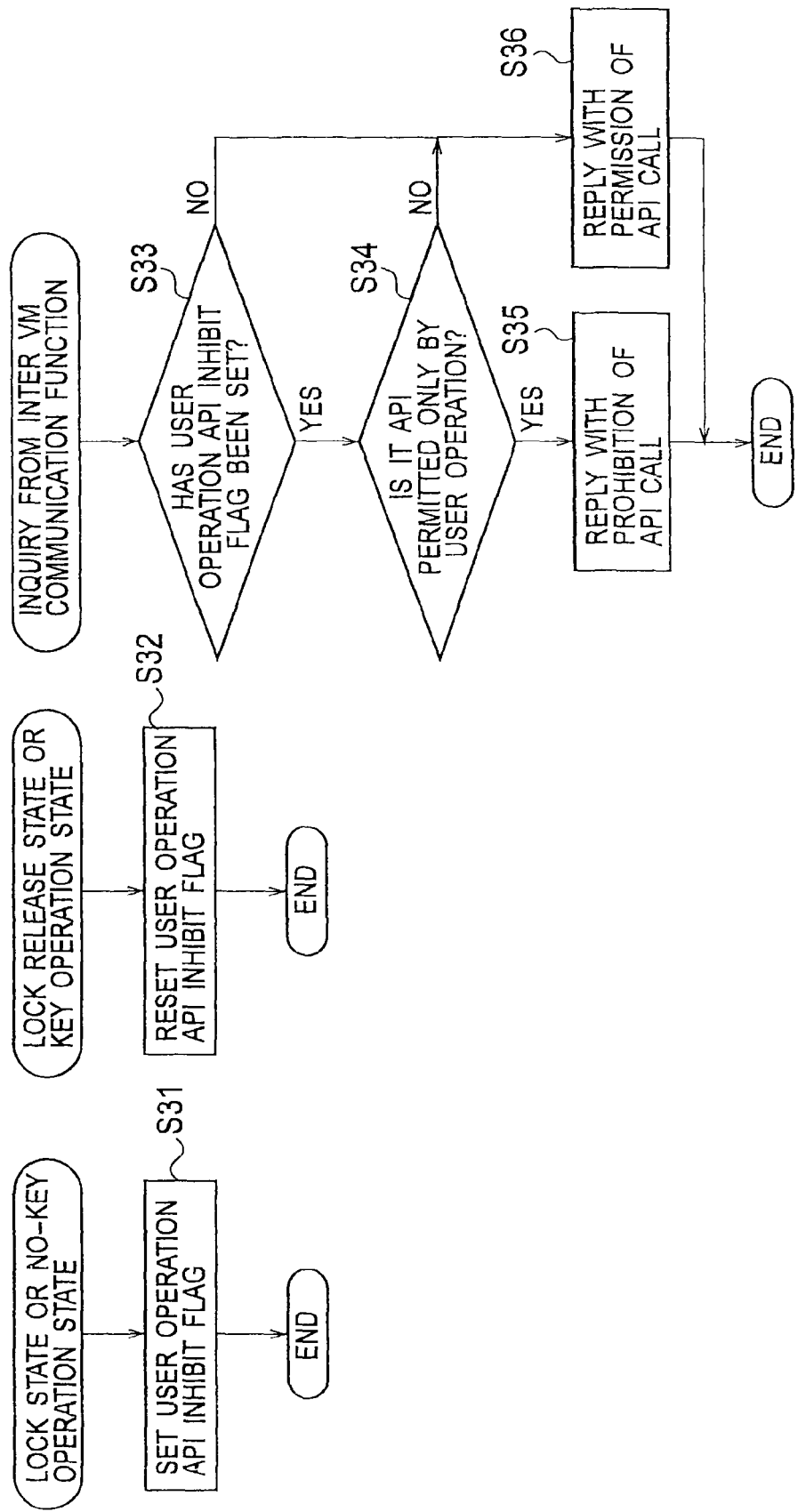
FIG. 3 is a diagram showing a suppression procedure of an API call in accordance with a lock state and an operating state according to the embodiment of the present invention.

(2.4.1) Suppression Procedure of the API Call in Accordance with the Lock State or the Operating State FIG. 3 shows a suppression procedure of the API call in accordance with the lock state or the operating state. Here, when a program performs the API call, the program calls the inter VM communication function, and the inter VM communication function inquires of the state monitor 200 whether to permit the API call.

Step 31 is executed when the device 100 is in the local lock state or the remote lock state, or when the device 100 is in the no-input operation state where the device 100 receives no input operation for a predetermined period. In Step 31, the state manager 201 sets the user operation API inhibit flag, and maintains the state.

Step 32 is executed when the local lock state or the remote lock state of the device 100 is canceled, or when the device 100 receives an input operation in the no-input operation state. In Step 32, the state manager 201 resets the user operation API inhibit flag, and maintains the state.

Step 33 is executed when the inter VM communication function inquires of the state monitor 200. In Step 33, the permission determining unit 203 checks whether the user operation API inhibit flag has been set.

When the user operation API inhibit flag has been set (YES in Step 33), in Step 34, the permission determining unit 203 checks whether the API call is the type of API call permitted only when requested by operation of the user.

When the API call is the API call permitted only when requested by operation of the user (YES in Step 34), in Step 35, the permission determining unit 203 determines to prohibit (suppress) the API call, and replies to the inter VM communication function.

When the API call is not the API call permitted only when requested by operation of the user (NO in Step 34), in Step 36, the permission determining unit 203 determines to permit the API call, and replies to the inter VM communication function.

(2.4.2) Notification Procedure of the State Information

Figure 4:
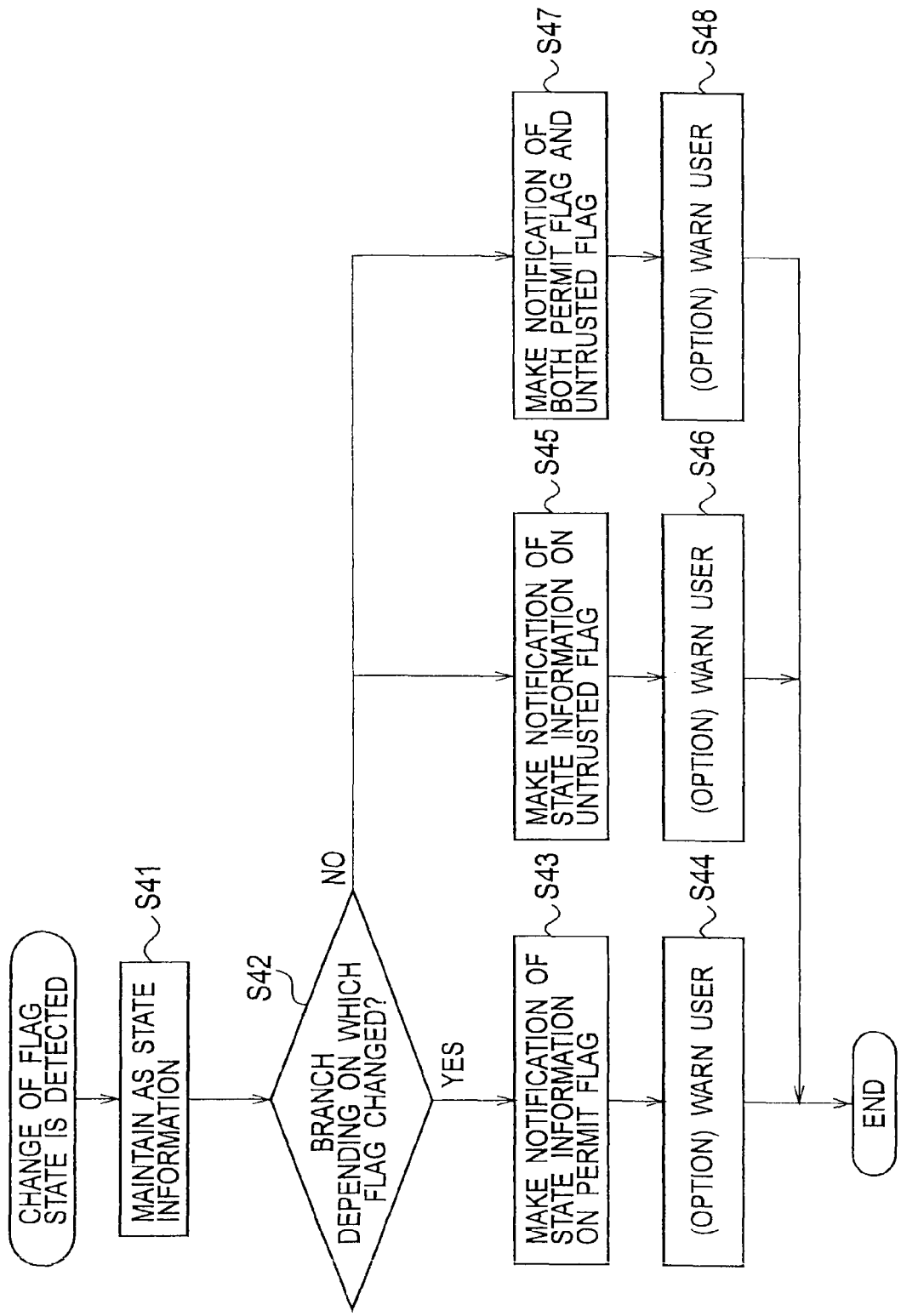
FIG. 4 is a diagram showing a notification procedure of the status information according to the embodiment of the present invention.

FIG. 4 shows a notification procedure of the state information. As shown in FIG. 4, in Step 41, the state manager 201 detects change of a program execution state (flag state) in the open execution environment 120, and maintains the change as the state information. The state manager 201 sets the untrusted flag when one or more untrusted programs P2 are executed or installed in the open execution environment 120. The state manager 201 also sets the permit flag when the mandatory program P3 mandatory to normal execution of the API call of the closed execution environment 130 is properly running or installed in the open execution environment 120.

In Step 42, the permission determining unit 203 detects change of a flag, and executes processing corresponding to the changed flag. When a state of the permit flag changes, the permission determining unit 203 executes processing in Step 43. When a state of the untrusted flag changes, the permission determining unit 203 executes processing in Step 45. When states of a plurality of flags change, the permission determining unit 203 executes processing in Step 47.

In Step 43, the state information notifying unit 205 notifies the API checking device 300 of the state information on the permit flag.

In Step 44, when the permit flag has been reset, the state information notifying unit 205 may warn the user that the system (device 100) is not normal, as an option. In that case, the state monitor 200 may restart the device 100 for restoration after asking the user.

In Step 45, the state information notifying unit 205 notifies the API checking device 300 of the state information on the untrusted flag.

In Step 46, when the untrusted flag has been set, the state information notifying unit 205 may warn the user that the system (device 100) is not normal, as an option. In that case, the state monitor 200 may restart the device 100 for restoration after asking the user.

In Step 47, the state information notifying unit 205 notifies the API checking device 300 as the state information on the permit flag and the untrusted flag.

In Step 48, as an option, the state information notifying unit 205 may restart the device 100 for restoration in a same manner as in Steps 44 and 46 mentioned above.

Figure 5:
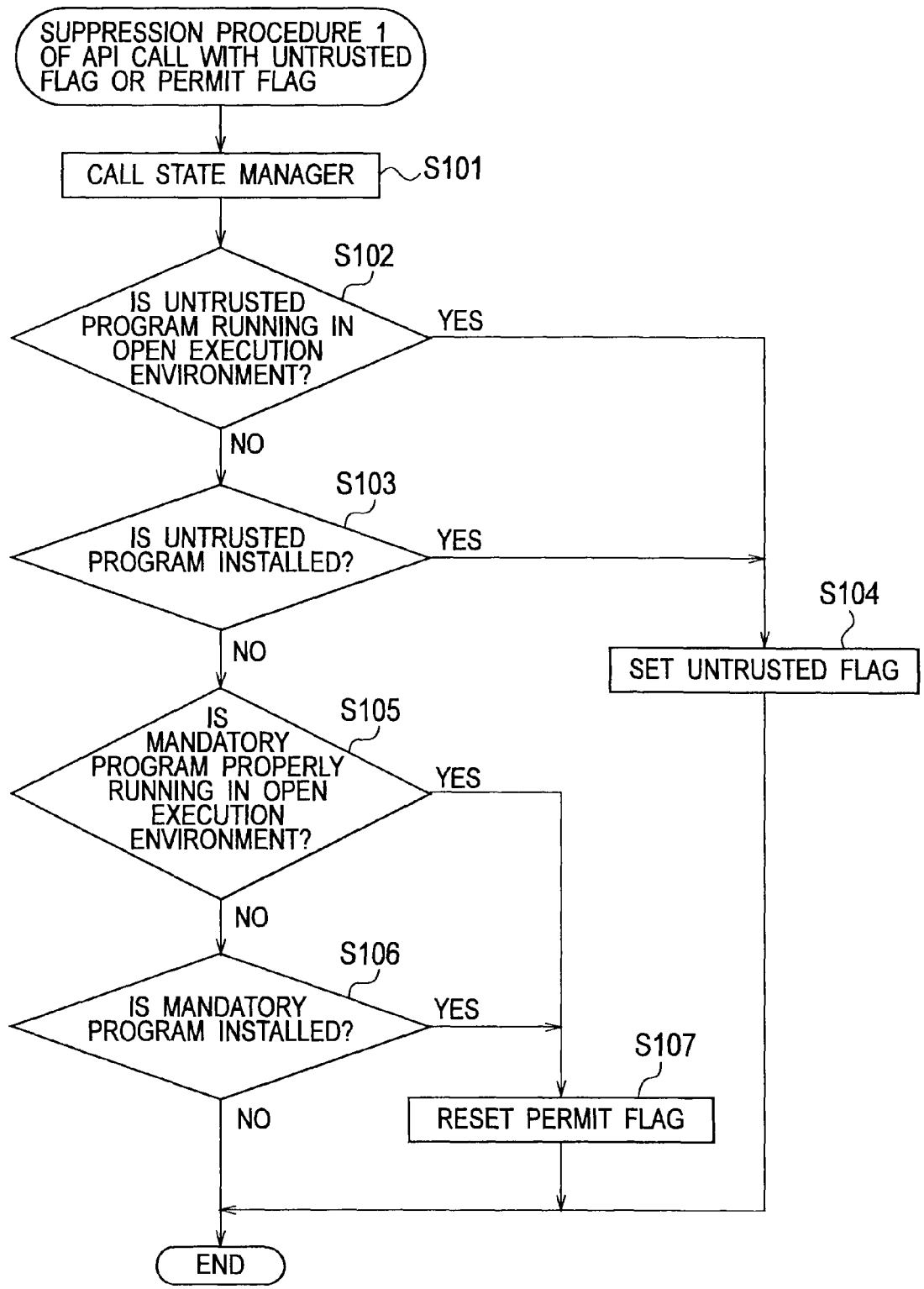
FIG. 5 is diagram showing a suppression procedure (No. 1) of the API call with an untrusted flag or a permit flag according to the embodiment of the present invention.
Figure 6:
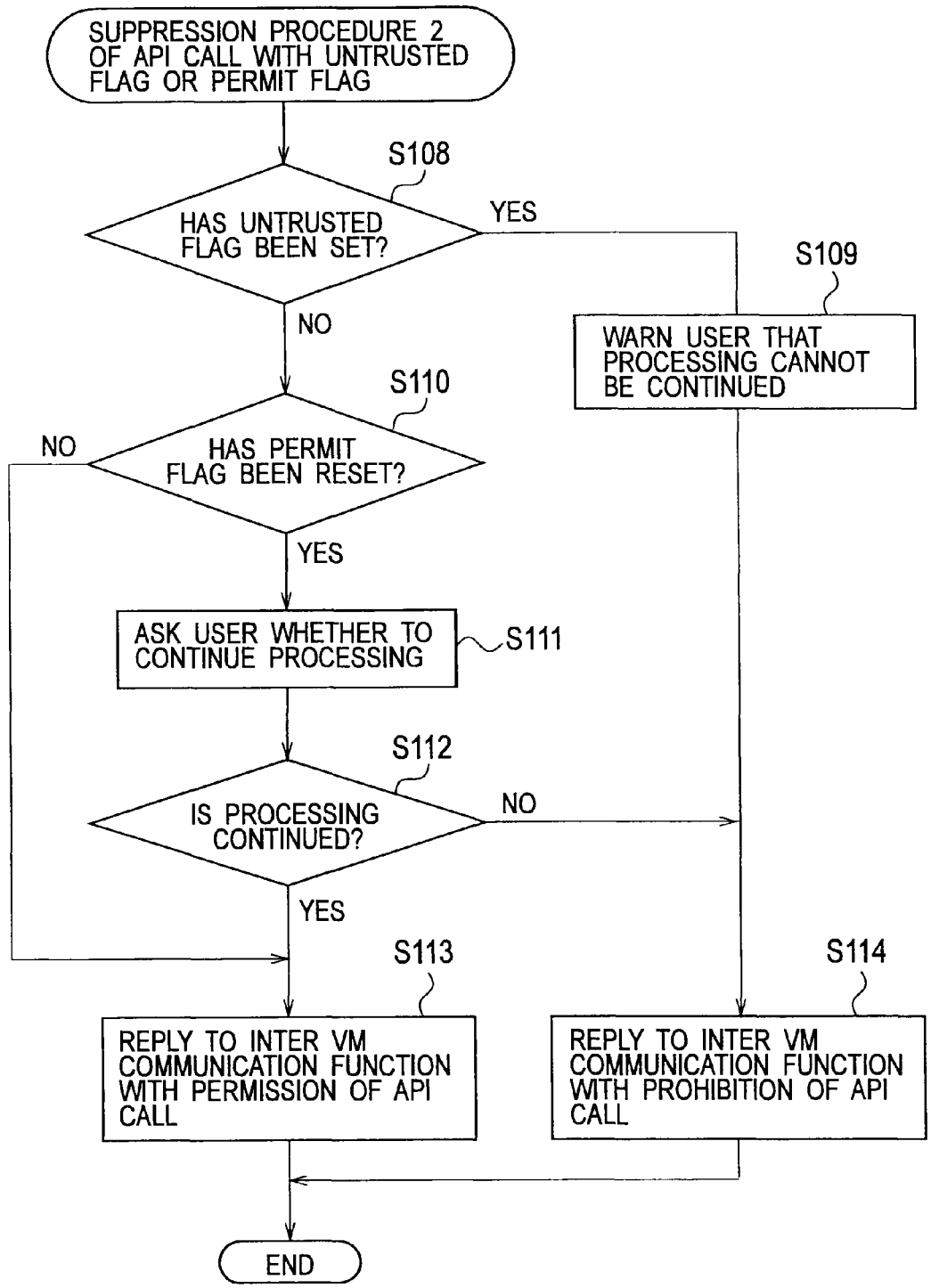
FIG. 6 is a diagram showing a suppression procedure (No. 2) of the API call with the untrusted flag or the permit flag according to the embodiment of the present invention.

(2.4.3) Suppression Procedure of the API Call with the Untrusted Flag or the Permit Flag FIGS. 5 and 6 each show a suppression procedure of the API call with the untrusted flag or the permit flag. Although the suppression procedure shown in FIG. 5 and that shown in FIG. 6 are similar to the notification procedure of the state information mentioned above, more detailed description will be given on setting of the untrusted flag and the permit flag, here.

As shown in FIG. 5, in Step 101, the state manager 201 is called when change of the execution state or installation state of the program in the open execution environment 120 is detected.

In Step 102, the state manager 201 determines whether one or more untrusted programs P2 are running in the open execution environment 120.

When the untrusted program P2 is not executed in the open execution environment 120 (NO in Step 102), in Step 103, the state manager 201 determines whether one or more untrusted programs P2 are installed in the open execution environment 120.

When the untrusted program P2 is running in the open execution environment 120 (YES in Step 102) or when the untrusted program P2 is installed in the open execution environment 120 (YES in Step 103), in Step 104, the state manager 201 sets the untrusted flag.

When the untrusted program P2 is not installed in the open execution environment 120 (NO in Step 103), in Step 105, the state manager 201 determines whether the mandatory program P3 mandatory to normal execution of the API call of the closed execution environment 130 is properly running in the open execution environment 120.

When the mandatory program P3 is not properly running in the open execution environment 120 (NO in Step 105), in Step 106, the state manager 201 determines whether the mandatory program P3 is installed in the open execution environment 120.

When the mandatory program P3 is properly running in the open execution environment 120 (YES in Step 105), or when the mandatory program P3 is installed in the open execution environment 120 (YES in Step 106), in Step 107, the state manager 201 resets the permit flag.

Processing in Step 108 shown in FIG. 6 is executed when the inter VM communication function inquires of the state monitor 200. In Step 108, the state manager 201 determines whether the untrusted flag has been set.

When the untrusted flag has been set (YES in Step 108), in Step 109, the state information notifying unit 205 warns the user that the system (device 100) is not normal and the processing cannot be continued. Then, in Step 114, the permission determining unit 203 determines to prohibit (suppress) the API call, and replies to the inter VM communication function.

When the untrusted flag has been reset (NO in Step 108), in Step 110, the state manager 201 determines whether the permit flag has been reset.

When the permit flag has been reset (YES in Step 110), in Step 111, the state information notifying unit 205 checks with the user whether to continue the processing although the system is not normal.

In Step 112, the state information notifying unit 205 determines whether a reply from the user requests continuation of the processing.

When the reply from the user requests continuation of the processing (YES in Step 112), in Step 113, the permission determining unit 203 determines to permit the API call, and replies to the inter VM communication function. When the permit flag has been set (NO in Step 110), in Step 113, the permission determining unit 203 determines to permit the API call, and replies to the inter VM communication function.

When the reply from the user does not request continuation of the processing (NO in Step 112), in Step 114, the permission determining unit 203 determines to prohibit (suppress) the API call, and replies to the inter VM communication function.

(2.4.4) Suppression Procedure of the API Call with the Cooperation Suppression Flag (CSF)

Figure 8:
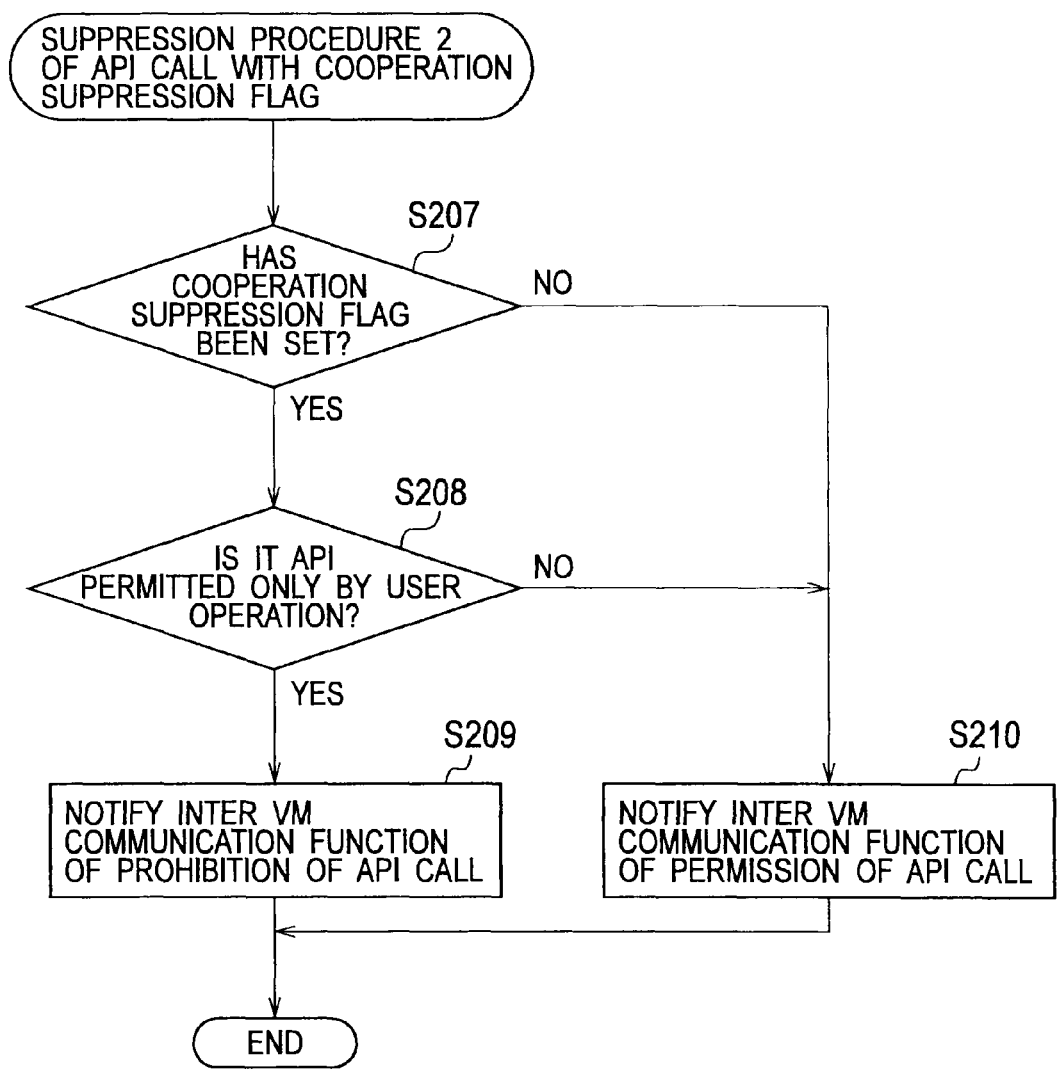
FIG. 8 is a diagram showing a suppression procedure (No. 2) of the API call with the cooperation suppression flag (lock release wait cooperation suppression flag (LRW-CSF) and user confirmation wait cooperation suppression flag (UCW-CSF)) according to the embodiment of the present invention.

FIG. 7 and FIG. 8 show a suppression procedure of the API call with the cooperation suppression flag (lock release wait cooperation suppression flag (LRW-CSF) and user confirmation wait cooperation suppression flag (UCW-CSF)). Here, when a program performs the API call, the program calls the inter VM communication function, and the inter VM communication function inquires of the state monitor 200 whether to prohibit (suppress) the API call.

As shown in FIG. 7(a), in Step 201, the state manager 201 receives at least one of the LRW-CSF and the UCW-CSF from the API checking device 300, and maintains the received flag.

In Step 202, the state manager 201 determines whether the received flag is the UCW-CSF.

When the received flag is the UCW-CSF (YES in Step 202), in Step 203, the state manager 201 determines whether the UCW-CSF has been set.

When the UCW-CSF has been set (YES in Step 203), in Step 204, the state manager 201 sets a specified timeout time and terminates the process.

Step 205 shown in FIG. 7(b) is executed periodically. In Step 205, the state manager 201 periodically determines whether the set timeout time elapses.

When the timeout time elapses (YES in Step 205), in Step 206, the state manager 201 resets the UCW-CSF.

Next, Step 207 shown in FIG. 8 is executed when the inter VM communication function inquires of the state monitor 200. In Step 207, the state manager 201 determines whether the LRW-CSF or the UCW-CSF has been set.

When either of the CSFs is set (YES in Step 207), in Step 208, the state manager 201 checks whether the API call is the API call permitted only when requested by operation of the user.

When the API call is the API call permitted only when requested by operation of the user (YES in Step 208), in Step 209, the permission determining unit 203 determines to prohibit (suppress) the API call, and replies to the inter VM communication function.

When the CSF has been reset (NO of Step 207), or when the API call is not the API call permitted only when requested by operation of the user (NO of Step 208), in Step 210, the permission determining unit 203 determines to permit the API call, and replies to the inter VM communication function.

(3) Functional Block Configuration of the API Checking Device

From function to process the API call of the closed execution environment 130 or the inter VM communication function on the closed execution environment 130 side, the API checking device 300 receives a determination request on whether to permit the API call to the closed execution environment 130 from the open execution environment 120. Then, the API checking device 300 answers the state monitor 200 on whether to permit or refuse the API call.

As shown in FIG. 1, the API checking device 300 includes an API check request reception unit 301, a state information acquiring unit 303, a check mode setting unit 305, a determining unit 307, a check result outputting unit 309, an API restriction manager 311, and an integrity checking unit 313.

(3.1) API Check Request Reception Unit 301

The API check request reception unit 301 receives a determination request that requests determination of whether to permit the API call from the open execution environment 120 to the closed execution environment 130. Specifically, the API check request reception unit 301 receives the determination request from the function to process the API call of the closed execution environment 130 or the inter VM communication function on the closed execution environment 130 side.

The API check request reception unit 301 can receive a determination request including a program identifier of an API call source. The program identifier of the API call source may be any of a name of a program, a unique number of a program, a hash value of a program, and an identification number specified by a program when the program calls the API 131, and the like.

The API check request reception unit 301 may also receive the program identifier of the API call source and the determination request including a type of the API 131. The type of the API 131 may be any of a name, category name, a number, a number of a category, and a hash value of the API 131. Moreover, an identification number specified by the program when the program calls the API 131 may be used also as the program identifier and the type of the API 131.

(3.2) State information Acquiring Unit 303

The state information acquiring unit 303 acquires the state information of the device 100 from the state monitor 200 or OSs/middleware disposed in the closed execution environment 130. The state information acquiring unit 303 then maintains the acquired state information. The state information acquiring unit 303 maintains the acquired state information by storing the acquired state information in storage such as a RAM or a hard disk. The state information acquiring unit 303 also acquires the state information from the state monitor 200 using message passing, a shared memory, etc. provided by the inter VM communication function.

As mentioned above, FIG. 2 shows a specific example of the state information. Notification of the state information may be one-way communication from the state monitor 200 to the API checking device 300, or when acknowledgement is demanded, acknowledgement (ACK) may be transmitted to the state monitor 200. Additionally, when a MAC or a digital signature is attached to the state information or the state information is encrypted, the state information acquiring unit 303 executes verification or decoding as necessary.

The state information acquiring unit 303 can acquire the local lock state, the remote lock state, or the no-input operation state as the state information. When the local lock state, the remote lock state, or the no-input operation state is managed in the closed execution environment 130, in the virtual machine monitor 110, or in other environment that is not the open execution environments 120, the state information acquiring unit 303 can acquire the state information safely. On the other hand, when the states are managed in the open execution environment 120, the state information may be tampered and the state information acquiring unit 303 cannot always acquire the correct state information.

Moreover, the state information acquiring unit 303 may set the LRW-CSF in the local lock state or the remote lock state, and notify the state monitor 200 that the flag has been set. Similarly, the state information acquiring unit 303 may set the UCW-CSF when a predetermined period elapses in the user confirmation waiting state, and notify the state monitor 200 that the flag has been set.

When the local lock state or remote lock state changes to another state, the state information acquiring unit 303 sets the LRW-CSF according to a state after change. Simultaneously, the state information acquiring unit 303 notifies the state monitor 200 of the LRW-CSF according to the state after change.

When the user confirmation waiting state is terminated while the UCW-CSF is being set, the state information acquiring unit 303 may reset the UCW-CSF and notify the state monitor 200 that the UCW-CSF has been reset. Further, predetermined timeout time is exceeded while the UCW-CSF is being set, the state information acquiring unit 303 may omit the notifying the state monitor 200 of the UCW-CSF reset.

The state information acquiring unit 303 uses the untrusted flag and the permit flag as the state information in the same manner as in the case of the state manager 201 mentioned above. The untrusted flag and the permit flag may be set from the state monitor 200 that operates in the open execution environment 120, or set from the virtual machine monitor 110 when the virtual machine monitor 110 manages the untrusted flag. Examples of the untrusted program P2, the determination method thereof, etc. are the same as those of the state manager 201.

The state information acquiring unit 303 may also acquire a permit flag list as the state information (see FIG. 2), the permit flag list including a list of permit flags each set with respect to corresponding one of a plurality of permitted programs P1 to which the API call to the closed execution environment 130 is permitted when the permitted program P1 is running in the open execution environment 120 or is installed in the device 100.

The state information acquiring unit 303 may also request the state monitor 200 to notify the state information (a) when the API call is performed a predetermined number of times, (b) when the API call is refused a predetermined number of times, and (c) when a predetermined period elapses after the last API call is performed. With such a notification, even if notification of the state information fails, inconsistency of the state information between the state monitor 200 and the API checking device 300 is eliminated in next notification. Alternatively, when there is no reply from the state monitor 200 for a predetermined period, the API checking device 300 may determine that a failure has occurred, and may take a countermeasure. For example, the API checking device 300 can execute a countermeasure, such as prohibition of the API call, restart of the device, or restart of the device after notifying the user.

(3.3) Check Mode Setting Unit 305

The check mode setting unit 305 sets an check mode for the API call on the basis of the state information acquired by the state information acquiring unit 303. The check mode denotes a policy of check to the API call.

The check mode setting unit 305 sets the check mode to a user operation inhibit mode when the state information is the local lock state, the remote lock state, or the no-input operation state. The user operation inhibit mode is a mode that prohibits the API call of the type permitted only when requested by operation of the user.

The check mode setting unit 305 may set the check mode to a user warning mode that warns the user in accordance with the state information when the untrusted flag has been set or when the permit flag has been reset. The check mode setting unit 305 may also set the check mode to the user warning mode when the check mode is set on the basis of a state of the permit flag, or when the flag corresponding to the program identifier received by the API check request reception unit 301 is reset.

The check mode setting unit 305 may set the check mode to an check omission mode that unconditionally permits the API call of the same type as the API call determined to be permitted or the API call including the program identifier indicating the same API call source as the API call determined to be permitted, for a predetermined number of times or for a predetermined period. Additionally, when a configuration of the device 100 is changed while the check mode is being set to the check omission mode, the check mode setting unit 305 may terminate the check omission mode. The change of configuration means, for example, activation/deactivation of application or installing/uninstalling of application.

(3.4) Determining Unit 307

The determining unit 307 determines whether to permit the API call on the basis of the check mode set by the check mode setting unit 305. The determining unit 307 also generates a check result of the API call on the basis of the determination result.

When the check mode is being set to the user operation inhibit mode and a type of the API call is permitted only when requested by operation of a user of the device, the determining unit 307 determines to prohibit the API call.

When the check mode is being set to the user warning mode, the determining unit 307 can warn the user in accordance with the state information, and can refuse the API call after asking the user whether to permit the API call or without performing the asking. The content of the warning to the user may be the same as that of the permission determining unit 203 mentioned above.

The determining unit 307 generates any of prohibition of the API call, permission of the API call, and refusal of the API call as the check result. The determining unit 307 may also generate the check result together with a code indicating a reason of the check result. The code indicates, for example, prohibition because the API call is not the API call on the basis of the user operation, or refusal because the mandatory program P3 mandatory to mandatory of the API call is not properly running.

When the permit flag corresponding to the program identifier is reset, the determining unit 307 may warn the user, and refuse the API call after asking the user whether to permit the API call or without performing the asking. When the check mode is being set to the check omission mode, the determining unit 307 generates the check result indicating omission of the check of the API call.

The determining unit 307 can inquire of the API restriction manager 311 on the basis of the determination request received by the API check request reception unit 301. Thereafter, when the program identifier included in the determination request corresponds to the type of the API call which is permitted, the determining unit 307 may permit the API call. Furthermore, when the permit flag has been set in the permit flag list, the determining unit 307 can inquire of the API restriction manager 311. Thereafter, when the program identifier included in the determination request corresponds to the type of the API call which is permitted and when an inquiry flag has been set and a condition of an API call argument is satisfied, the determining unit 307 can inquire of the user about the device 100.

The determining unit 307 permits the API call when the user permits the API call. Upon inquiry of the user, in order to avoid interference by the untrusted program in the open execution environment 120, it is desirable to present an inquiry message to the user and to input an input from the user to the inquiry outside the open execution environments 120, for example, in the closed execution environment 130.

The determining unit 307 may check a format such as a size, a type of the API call argument, a value, and a range of the value, or may scan the transferred data to check for the viruses. Furthermore, the determining unit 307 may check a history of a sequence of the API calls, and check whether order relation of particular API calls is correct.

(3.5) Check Result Outputting Unit 309

The check result outputting unit 309 outputs the check result of the API call generated by the determining unit 307 to a determination requesting source (processing function of the API 131, etc.) that requests determination of the API call.

The determination requesting source is the function for processing the API call of the closed execution environment 130, the inter VM communication function on the closed execution environment 130 side, and the like, as mentioned above. When the check result is "omission of the API check," the determination request source may omit more detailed API check in order to reduce resource consumption. The more detailed API check is, for example, check of a format such as a size, a type of the API call argument, a value, a range of the value, or virus check on the transferred data.

(3.6) API Restriction Manager 311

The API restriction manager 311 manages the type of the API 131 and the program identifier that permits or refuses the API call of the type.

FIG. 11 shows an example of the API 131 restricted by the API restriction manager 311. In the example of restriction shown in FIG. 11, as the type of the API 131, a DRM API, a secure storage API, and a crypto API are specified. Only program1 is permitted in the DRM API. Program1 and program2 are permitted in the secure storage API. Program1, program2, program3, and program 4 are permitted in the code API.

In addition to the type of the API 131 and the program identifier that permits or refuses the API call of the type, the API restriction manager 311 also can manage the inquiry flag indicating whether to inquire of the user of the device 100 whether to permit the API call, and a condition of the API call argument used for determination of whether to inquire. For example, in the API 131 that accesses a website of a URL specified by the API call argument, when the URL has a particular domain name, the API restriction manager 311 can inquire of the user. As another example, when the condition is not specified, the API restriction manager 311 can inquire of the user unconditionally.

(3.7) Integrity Checking Unit 313

The integrity checking unit 313 checks integrity of a state monitor program that provides function as the state monitor 200. The integrity checking unit 313 prohibits the API call when tampering with the state monitor program is detected.

For example, the integrity checking unit 313 maintains a correct hash value of a program code. The integrity checking unit 313 calculates the hash value of the program code periodically or when a particular event occurs, and compares the calculated hash value with the correct hash value. When the comparison result has no coincidence, the integrity checking unit 313 can determine that there has been tampering. Examples of the particular event include a case where there is access (read or write) to a memory or a file area where the state monitor program is stored, a case where there is a particular API call of the closed execution environment 130, and a case where a particular API call or a system call in the open execution environment 120 is performed.

Furthermore, the integrity checking unit 313 may check presence of tampering with an OS, middleware, and an application program within the open execution environment 120 except the state monitor 200. When detecting tampering with these, the integrity checking unit 313 can prohibit the API call. The integrity checking unit 313 may be implemented as a part of a VMM (virtual machine monitor).

(3.8) Operation of the API Checking Device

Next, operation of the API checking device 300 will be described. Specifically, description will be given of a setting procedure of the check mode and a check procedure of the API call.

(3.8.1) Setting Procedure of the Check Mode

Figure 9:
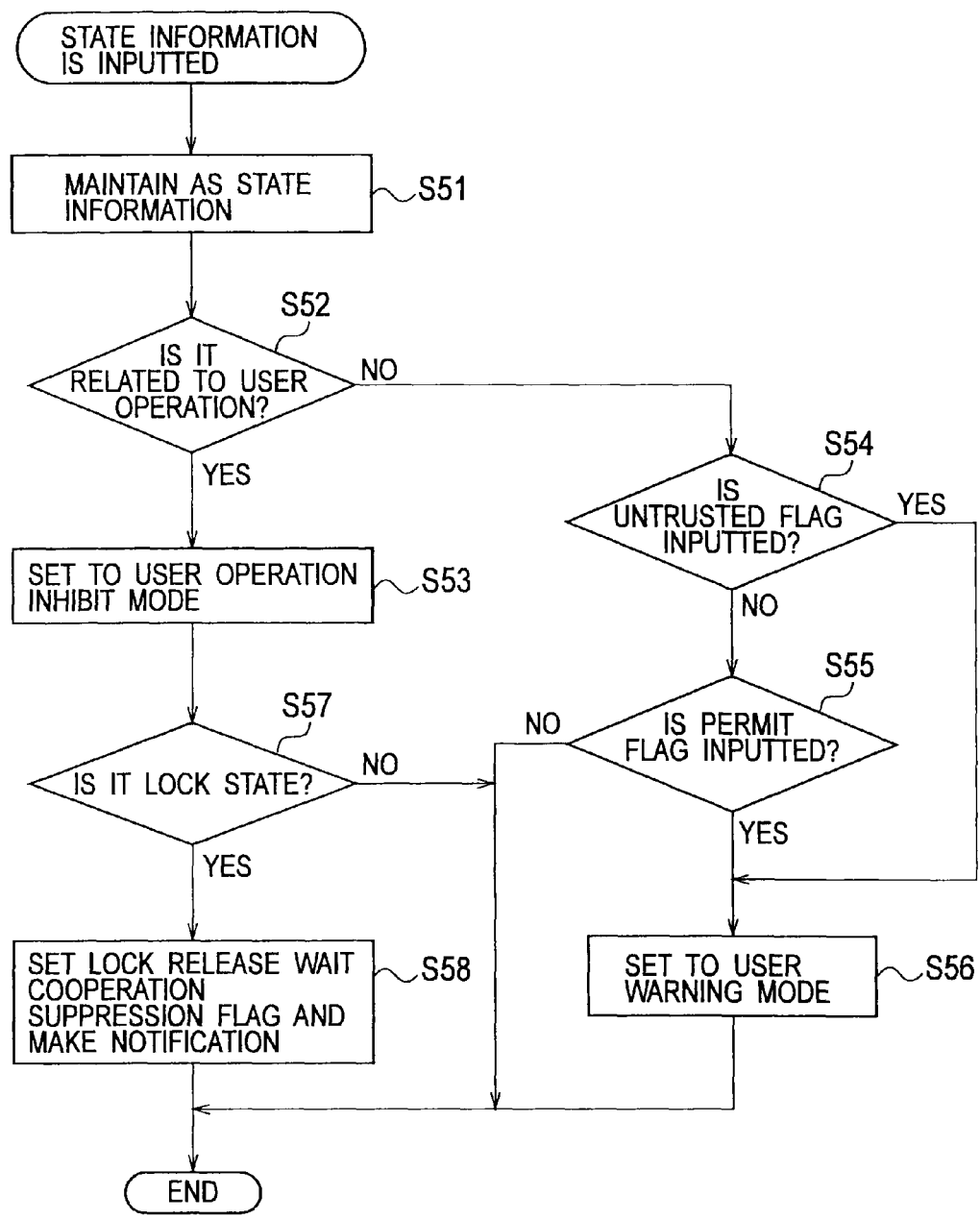
FIG. 9 is a diagram showing a setting procedure of a check mode according to the embodiment of the present invention.

FIG. 9 shows the setting procedure of the check mode by the API checking device 300. The setting procedure of the check mode is executed when the state information is inputted from the state monitor 200 to the API checking device 300 (state information acquiring unit 303), when the state information acquiring unit 303 detects change of the state information, or when the state information acquiring unit 303 is notified of the state information.

As shown in FIG. 9, in Step 51, the state information acquiring unit 303 maintains the inputted state information.

In Step 52, the state information acquiring unit 303 determines whether the inputted state information is a state related to user operation. Specifically, the state information acquiring unit 303 determines whether it is the local lock state, the remote lock state, or the no-input operation state.

When the inputted state information is the state related to user operation (YES in Step 52), in Step 53, the check mode setting unit 305 sets the check mode to the user operation inhibit mode.

In Step 57, the state information acquiring unit 303 determines whether the inputted state information shows any of the local lock state and the remote lock state.

When it is either the local lock state or the remote lock state (YES in Step 57), in Step 58, the state information acquiring unit 303 sets the LRW-CSF, and notifies the state monitor 200 that the LRW-CSF has been set.

On the other hand, when the inputted state information is not the state related to user operation, in Step 54, the state information acquiring unit 303 determines whether the inputted state information is the untrusted flag.

When the inputted state information is not the untrusted flag (NO in Step 54), in Step 55, the state information acquiring unit 303 determines whether the inputted state information is the permit flag.

When the inputted state information is the untrusted flag (YES in Step 54) or when the inputted state information is the permit flag (YES in Step 55), in Step 56, the check mode setting unit 305 sets the check mode to the user warning mode.

(3.8.2) Check Procedure of the API Call

Figure 10:
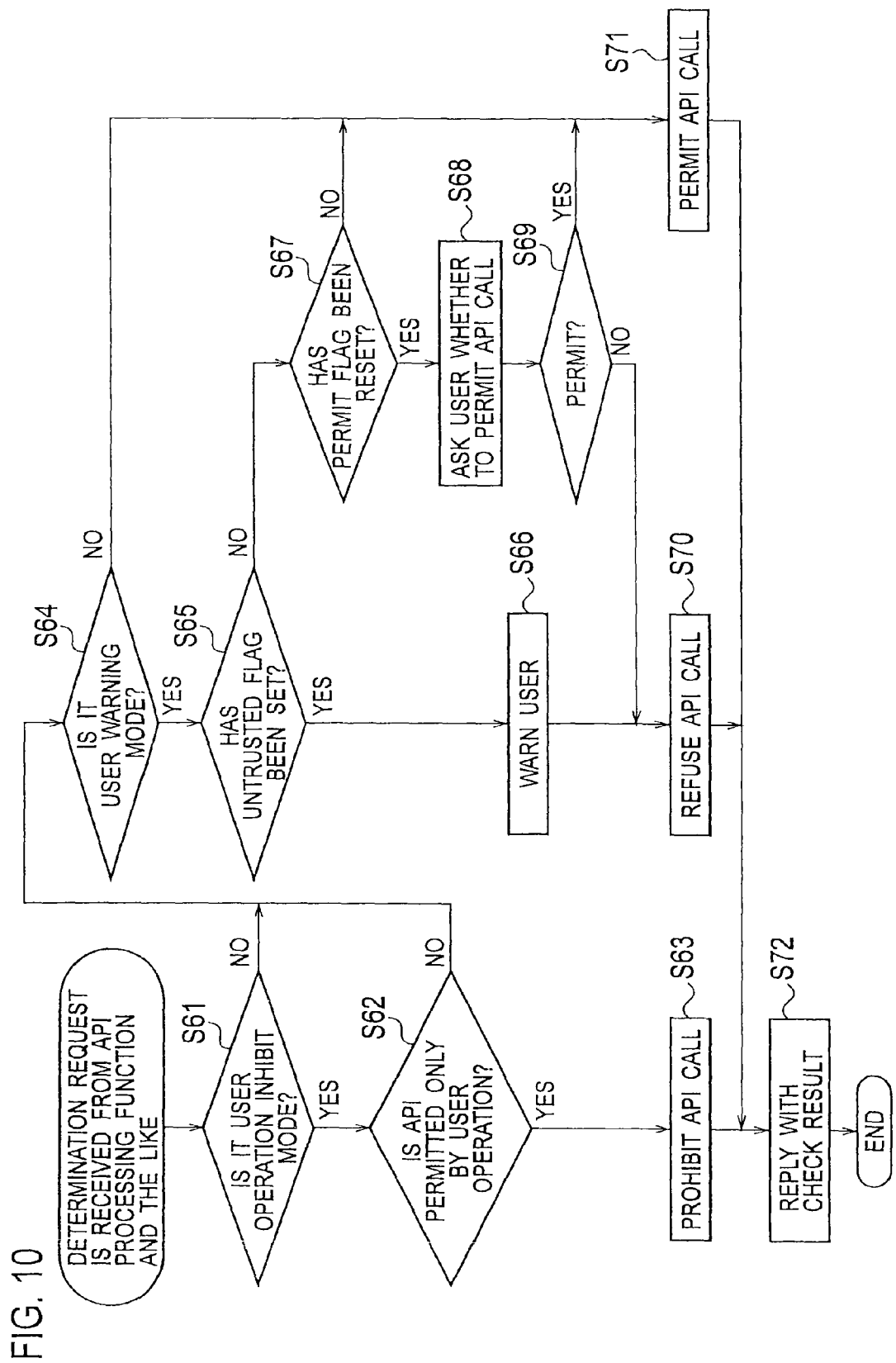
FIG. 10 is a diagram showing a check procedure of the API call according to the embodiment of the present invention.

FIG. 10 shows a check procedure of the API call by the API checking device 300. The check procedure of the API call is executed when the API check request reception unit 301 receives the determination request to determine whether to permit the API call from the open execution environment 120 to the closed execution environment 130 from the processing function of the API 131 of the closed execution environment 130, the inter VM communication function on the closed execution environment 130 side, etc. Here, the determination request may include the program identifier of the API call source.

In Step 61, the determining unit 307 checks for the check mode set, and determines whether the check mode has been set to the user operation inhibit mode.

When the check mode has been set to the user operation inhibit mode (YES in Step 61), in Step 62, the determining unit 307 determines whether the API call is the API call of the type permitted only when requested by operation of the user.

When the API call is the API call of the type permitted only when requested by operation of the user (YES in Step 62), in Step 63, the determining unit 307 generates prohibition of the API call as a check result.

When the check mode is not set to the user operation inhibit mode (NO in Step 61), in Step 64, the determining unit 307 determines whether the check mode has been set to the user warning mode.

When the check mode has been set to the user warning mode (YES in Step 64), in Step 65, the determining unit 307 determines whether the untrusted flag has been set.

When the untrusted flag has been set (YES in Step 65), in Step 66, the determining unit 307 performs warning in accordance with the state information.

When the untrusted flag has been reset (NO in Step 65), at Step 67, the determining unit 307 determines whether the permit flag has been reset.

When the permit flag has been reset (YES in Step 67), in Step 68, the determining unit 307 checks with the user whether to permit the API call.

In Step 69, the determining unit 307 determines whether the user has permitted the API call.

Subsequent to the processing in Step 66 or when the user refuses the API call (NO in Step 69), in Step 70, the determining unit 307 generates refusal of the API call as the check result.

When the check mode is not set to the user warning mode (NO in Step 64), when the permit flag has been set (NO in Step 67), or when the user permits the API call (YES of Step 69), in Step 71, the determining unit 307 generates permission of the API call as the check result.

In Step 72, the check result outputting unit 309 responds to the processing function of the API 131, the communication function for the VMs, and the like, with the check result generated by the determining unit 307.

Note that, when the state information acquiring unit 303 maintains the permit flag in a form of a list corresponding to the program identifier, in Step 67, the determining unit 307 may check whether the program corresponding to "the program identifier of the API call source" included in the determination request is reset with respect to the permit flag. When the permit flag has been reset, in order to show that the program is not executed, there is a possibility that an unauthorized program is performing the API call by spoofing as an authorized program. Then, warning to the user may be performed, or the API call may be refused.

(4) Advantageous Effect

According to this embodiment, when the device 100 is in the local lock state, the remote lock state, or the no-input operation state, the check mode is set to the user operation inhibit mode. In the user operation inhibit mode, cooperation of the API call of the type permitted only when requested by operation of the user can be prohibited. Thereby, the unauthorized program can be prohibited from freely making such an API call of cooperation function. In other words, an unauthorized API call can be prevented, and the overhead can be suppressed at the same time.

Specifically, the state information can be acquired and permission of the API call can be determined with relatively lower processing load. Moreover, when the states are managed in the closed execution environment 130, check can be executed safely with relatively lower processing load. Thus, according to this embodiment, the detection is dependent not only on access control by the OS, and overhead caused by check processing of an argument or data can be suppressed.

In this embodiment, the state of the LRW-CSF and that of the UCW-CSF are notified to the open execution environment 120 from the closed execution environment 130. Thereby, cooperation of an invalid API call is suppressed. For this reason, exhaustion of a battery of the device 100 can be suppressed. Further, termination of cooperation suppression concerning waiting for confirmation by the user can be omitted by using a timer. Accordingly, a frequency of notification of the state can be minimized, and consumption of resources concerning notification can be reduced.

In this embodiment, after check of the API call succeeds, check of the API call of a particular type can be omitted (thinned out) for the specified number of times of the API call. Accordingly, safety and overhead, which are in a relationship of a trade-off, can be adjusted to an appropriate level.

In this embodiment, the user can be warned in accordance with the state information. For this reason, before the API call is executed, the user can know information on safety and reliability of the open execution environment 120. The user can take appropriate measures, such as determining permission of the API call and storing data not stored yet, on the basis of the information.

In this embodiment, when the permit flag corresponding to the program identifier is reset, the user can be warned. For this reason, the API call by a spoofing program other than the permitted program P1 can be securely refused.

In this embodiment, the check result can be generated together with the code indicating a reason for the check result of the API call. For this reason, when the API call by the program or the user fails, the reason can be recognized. In other words, the reason for the refusal of the API call source can be identified, whether because the API call is not the API call on the basis of the user operation, whether because the mandatory program P3 mandatory to execution of the API call is failed, or the like. Thereby, appropriate measures can be taken. For example, when the mandatory program P3 is failed, the user can restore the device 100 to the normal state by restarting the device 100.

The check omission mode is provided in this embodiment. Accordingly, reduction in a frequency of check of the API call can be expected without greatly sacrificing the safety, the reduction leading to reduction in deterioration of response and reduction in resource consumption. Moreover, in this embodiment, the check omission mode is terminated after the configuration of the system is changed. For this reason, certain level of safety can also be secured.

In this embodiment, the user of the device 100 may be inquired of in a situation in which: the program identifier included in the determination request corresponds to the type to which the API call is permitted; the inquiry flag has been set; and the condition of the argument of the API call is satisfied. For this reason, fine access control of the API call can be performed for each program, and reliability and safety can be improved. Moreover, the user of the device 100 can be inquired of in a situation in which: the program identifier included in the determination request corresponds to the type to which the API call is permitted; the inquiry flag has been set; and the condition of the argument of the API call is satisfied. For this reason, permission of a particular API call can be determined on the basis of confirmation by the user.

In this embodiment, the integrity checking unit 313 that checks the integrity of the state monitor program providing function as the state monitor 200 is provided. For this reason, when the state monitor 200 is attacked, prohibition of the API call can prevent the damages from spreading.

In this embodiment, when the untrusted flag changes to the set state or when the permit flag changes to the reset state, the API checking device 300 disposed in the closed execution environment 130 is notified of the state information. For this reason, before the API call is executed, the user can be notified of information on the safety or reliability of the open execution environment 120 on the closed execution environment 130 side.

(5) Other Embodiments

While the present invention has been described with the above-mentioned embodiments, it is to be understood that the statements and drawings that make a part of this disclosure does not limit the present invention. From this disclosure, various alternative embodiments will be apparent to persons skilled in the art.

In the device 100 mentioned above, description has been given of a case where the virtual machine monitor 110 is used. However, the open execution environment 120 and the closed execution environment 130 may be formed using a multi CPU (or multi core).

Figure 12:
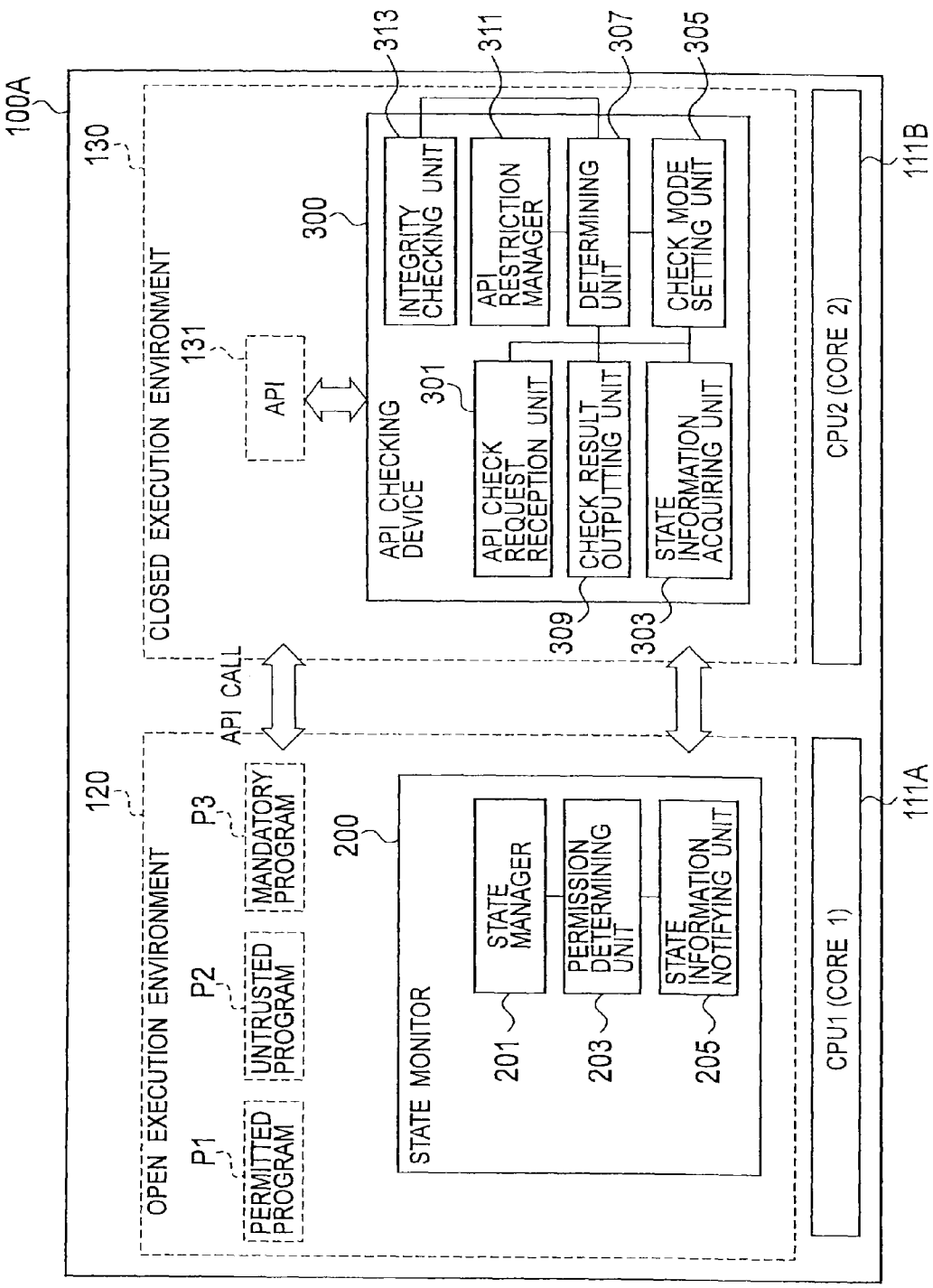
FIG. 12 is a functional block diagram of a device 100A according to another embodiment of the present invention.

FIG. 12 is a functional block diagram of a device 100A in which the open execution environment 120 and the closed execution environment 130 are formed by using a CPU 111A and a CPU 111B in a multi core configuration. Since the configuration of the state monitor 200 and that of the API checking device 300 are the same as those of the device 100 mentioned above, description thereof will be omitted.

Figure 13:
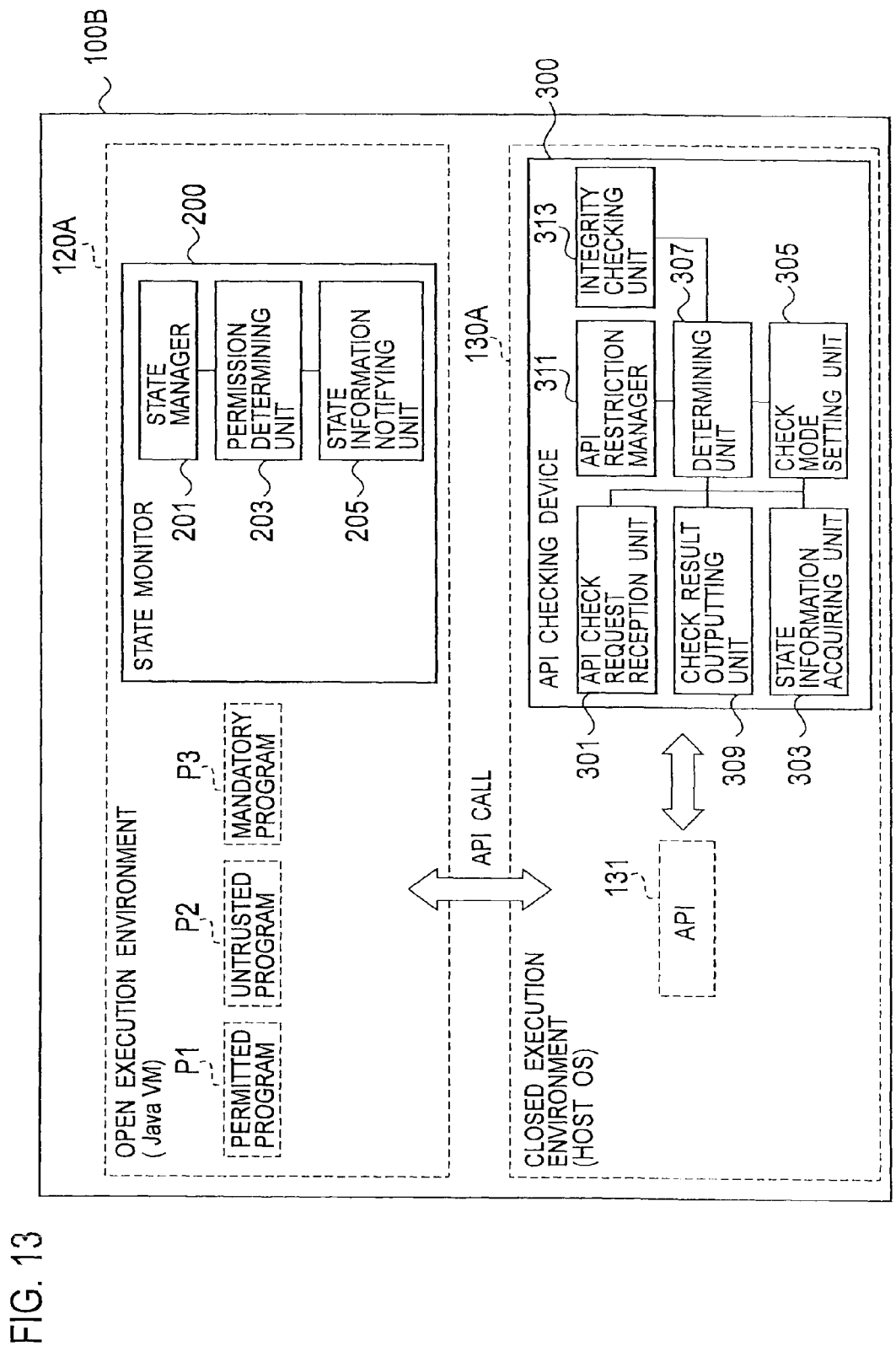
FIG. 13 is a functional block diagram of a device 100B according to still another embodiment of the present invention.

Alternatively, instead of the virtual machine monitor 110, a virtual machine such as JavaVM may be used to form an open execution environment, and a host OS may be used to form a closed execution environment. FIG. 13 is a functional block diagram of a device 100B in which a virtual machine and a host OS are used. In the device 100B, the open execution environment 120A is formed by the JavaVM, and the closed execution environment 130A is formed by the host OS. Since the configuration of the state monitor 200 and that of the API checking device 300 are the same as those of the device 100 mentioned above, description thereof will be omitted.

In addition, the state monitor 200 and the API checking device 300 each may be provided independently.

As described above, obviously, the present invention includes various embodiments not described herein. The technical scope of the present invention is thus defined only by claimed elements according to the scope of claims as appropriate to the descriptions above.

Note that the entire contents of the Japanese Patent Applications No. 2008-242637, filed on Sep. 22, 2008, and No. 2009-196691, filed on Aug. 27, 2009, are incorporated herein by reference.

What is claimed is:

1. An API checking device disposed in a closed execution environment in a device including: an open execution environment in which a program other than a trusted program can also be executed freely or under a given restriction; and the closed execution environment in which predetermined processing is executed on the basis of an API call that calls an application program interface from the open execution environment and only the trusted program is executed, the API checking device comprising:
a processor;
an API check request receiver, provided by the processor, that receives a determination request to request determination of whether to permit the API call within the closed execution environment from the open execution environment;
a state information acquirer, implemented by the processor, that acquires state information showing a state of the device;
a check mode setter, implemented by the processor, that sets a check mode for the API call on the basis of the state information acquired by the state information acquirer;
a determiner, implemented by the processor, that determines whether to permit the API call on the basis of the check mode set by the check mode setter, and generates a check result of the API call; and
a check result outputter, implemented by the processor, that outputs the check result generated by the determiner,
wherein the state information acquirer acquires, as the state information on the device, at least any one of a local lock state, a remote lock state, and a no-input operation state being a state in which the device receives no user key input operation thereto for a predetermined period,
the check mode setter sets the check mode to a user operation inhibit mode when the state information is the local lock state, the remote lock state, or the no-input operation state, and
when the check mode has been set to the user operation inhibit mode and a type of the API call is permitted only when requested by operation of a user of the device, the determiner prohibits the API call.

2. The API checking device according to claim 1, wherein
the state information acquirer uses an untrusted flag as the state information,
the untrusted flag is set when at least one untrusted program not trusted is running in the open execution environment or when the untrusted program is installed in the device,
the untrusted flag is reset when untrusted programs are not running or when untrusted programs are not installed in the device,
the check mode setter sets the check mode to a user warning mode when the untrusted flag has been set, and
the determiner warns a user of the device in accordance with the state information when the check mode has been set to the user warning mode, and refuses the API call based on a result of asking the user whether to permit the API call or without performing the asking.

3. The API checking device according to claim 1, wherein
the state information acquirer uses a permit flag as the state information,
the permit flag is set when mandatory programs mandatory to normal execution of the API call to the closed execution environment are properly running in the open execution environment or when the mandatory programs are installed in the device,
the permit flag is reset when the mandatory programs are failed or when the mandatory programs are not installed in the device,
the check mode setter sets the check mode to a user warning mode when the permit flag has been reset, and
the determiner warns a user of the device in accordance with the state information when the check mode has been set to the user warning mode, and refuses the API call based on a result of asking the user whether to permit the API call or without performing the asking.

4. The API checking device according to claim 1, wherein
the API check request receiver receives a determination request including a program identifier of an API call source, the API call source being a call source of the application program interface,
the state information acquirer acquires a permit flag list as the state information, the permit flag list including a list of permit flags each set with respect to a corresponding one of a plurality of permitted programs to which the API call to the closed execution environment is permitted when the permitted program is running in the open execution environment or when the permitted program is installed in the device, and
the determiner warns the user when the permit flag corresponding to the program identifier has been reset, and refuses the API call based on a result of asking the user whether to permit the API call or without performing the asking.

5. The API checking device according to claim 1, wherein the state information acquirer sets a lock release wait cooperation suppression flag according to a state after change when the local lock state or the remote lock state changes to another state, and notifies a state monitor of the lock release wait cooperation suppression flag according to the state after change, the state monitor configured to monitor a state of the program executed in the open execution environment.

6. The API checking device according to claim 1, wherein
when a predetermined period elapses in a user confirmation waiting state in the closed execution environment, the state information acquirer sets a user confirmation wait cooperation suppression flag, and notifies a state monitor of the user confirmation wait cooperation suppression flag, the state monitor configured to monitor a state of the program executed in the open execution environment, and
when the user confirmation waiting state is terminated while the user confirmation wait cooperation suppression flag has been set, the API check request state information acquirer resets the user confirmation wait cooperation suppression flag, and notifies the state monitor that the user confirmation wait cooperation suppression flag has been reset.

7. The API checking device according to claim 1, wherein the determiner generates any one of prohibition of the API call, permission of the API call, and refusal of the API call as the check result together with a code indicating a reason for the check result.

8. The API checking device according to claim 1, wherein
for an API call of a same type as that of the API call determined to be permitted or an API call including the program identifier indicating a same API call source as that of the API call determined to be permitted,
the check mode setter sets the check mode to a check omission mode in which such an API call is unconditionally permitted a predetermined number of times or for a predetermined period, and
when the check mode has been set to the check omission mode, the determiner generates the check result indicating that further check of the API call can be omitted.

9. The API checking device according to claim 1, further comprising:
an API restriction manager that manages a type of the application program interface and the program identifier that permits or refuses the API call of the type, wherein
the API check request receiver receives a determination request including the program identifier of the API call source and the type of the application program interface,
the determiner inquires of the API restriction manager, and
when the program identifier included in the determination request corresponds to the type to which the API call is permitted, the determiner permits the API call.

10. The API checking device according to claim 9, wherein
in addition to the type of the application program interface and the program identifier that permits or refuses the API call of the type, the API restriction manager manages an inquiry flag indicating whether to inquire of the user of the device about permission of the API call, and manages a condition of an API call argument, the condition used to determine whether to perform the inquiry,
the determiner inquires of the user in a situation in which the program identifier included in the determination request corresponds to the type to which the API call is permitted, the inquiry flag is set, and the condition of the API call argument is satisfied, when the determiner inquires of the API restriction manager, and
when the user permits the API call, the determiner permits the API call.

11. The API checking device according to claim 8, wherein the check mode setter terminates the check omission mode when a configuration of the device is changed while the check omission mode is being set.

12. The API checking device according to claim 1, further comprising an integrity checker that checks integrity of a state monitor program that provides function as the state monitor, and to prohibit the API call when tampering with the state monitor program is detected.

* * * * *